(12) United States Patent
Kruse et al.

(10) Patent No.: US 12,183,184 B2
(45) Date of Patent: Dec. 31, 2024

(54) ADAPTIVE NOTIFICATION SYSTEM BASED ON CONTEXTUAL INFORMATION

(71) Applicant: 3M INNOVATIVE PROPERTIES COMPANY, St. Paul, MN (US)

(72) Inventors: John M. Kruse, Minneapolis, MN (US); Lori A. Sjolund, Stillwater, MN (US); Vera Shuman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 415 days.

(21) Appl. No.: 17/309,566

(22) PCT Filed: Nov. 25, 2019

(86) PCT No.: PCT/IB2019/060128
§ 371 (c)(1),
(2) Date: Jun. 4, 2021

(87) PCT Pub. No.: WO2020/115606
PCT Pub. Date: Jun. 11, 2020

(65) Prior Publication Data
US 2022/0028248 A1 Jan. 27, 2022

Related U.S. Application Data

(60) Provisional application No. 62/826,041, filed on Mar. 29, 2019, provisional application No. 62/776,573, filed on Dec. 7, 2018.

(51) Int. Cl.
*G08B 25/00* (2006.01)
*G06N 20/00* (2019.01)
(Continued)

(52) U.S. Cl.
CPC ........... *G08B 25/007* (2013.01); *G06N 20/00* (2019.01); *G08B 9/00* (2013.01); *G08B 21/10* (2013.01); *G08B 21/18* (2013.01)

(58) Field of Classification Search
CPC ...... G08B 25/007; G08B 21/10; G08B 21/18; G06N 20/00
See application file for complete search history.

(56) References Cited

U.S. PATENT DOCUMENTS 3,914,692 A 10/1975 Seaborn, Jr.
5,319,355 A 6/1994 Russek
(Continued)

FOREIGN PATENT DOCUMENTS

CN 101729640 6/2010
CN 102043811 5/2011
(Continued)

OTHER PUBLICATIONS

International Search report for PCT International Application No. PCT/IB2019/060128 mailed on Mar. 3, 2020, 12 pages.
European Search Report, EP 19892867.3, Jul. 29, 2022, 3 pages. .

*Primary Examiner* — Nabil H Syed
*Assistant Examiner* — Cal J Eustaquio
(74) *Attorney, Agent, or Firm* — Yufeng Dong; Sriram Srinivasan

(57) ABSTRACT

Adaptive systems and methods for managing and delivering notifications to workers in a work environment are provided. The adaptive notification system receives and assesses contextual information to adjust notification configurations or to propose options or alternatives of adjustments to guide a user to adjust the notification configurations.

19 Claims, 16 Drawing Sheets

(51) Int. Cl.
*G08B 9/00* (2006.01)
*G08B 21/10* (2006.01)
*G08B 21/18* (2006.01)

(56) References Cited

U.S. PATENT DOCUMENTS

| | | | |
|---|---|---|---|
| 6,078,260 A | 6/2000 | Desch | |
| 6,166,642 A | 12/2000 | Farshid | |
| 6,842,877 B2 | 1/2005 | Robarts | |
| 6,963,283 B1 | 11/2005 | Gonzalez | |
| 7,137,069 B2 | 11/2006 | Abbott | |
| 7,312,709 B2 | 12/2007 | Kingston | |
| 7,831,529 B2 | 11/2010 | Horvitz | |
| 8,020,104 B2 | 9/2011 | Robarts | |
| 8,495,661 B2 | 7/2013 | Carey | |
| 8,707,201 B1 | 4/2014 | Aradhye | |
| 8,775,332 B1 | 7/2014 | Morris | |
| 8,819,278 B2 | 8/2014 | Gloawacki | |
| 9,319,369 B2 | 4/2016 | Faaborg | |
| 9,397,968 B2 | 7/2016 | Wang | |
| 9,443,410 B1 * | 9/2016 | Constien | G08B 21/043 |
| 9,444,923 B1 | 9/2016 | Chen | |
| 9,501,337 B2 | 11/2016 | Shapiro | |
| 9,503,409 B2 | 11/2016 | Heiby | |
| 9,525,774 B2 | 12/2016 | Silver | |
| 9,565,153 B2 | 2/2017 | Hossack | |
| 10,089,847 B2 | 10/2018 | Zhu | |
| 2002/0008625 A1 | 1/2002 | Adams | |
| 2002/0021231 A1 | 2/2002 | Schlager | |
| 2002/0176323 A1 | 11/2002 | Magine | |
| 2003/0046421 A1 | 3/2003 | Horvitz | |
| 2003/0132859 A1 | 7/2003 | Bissett | |
| 2004/0130446 A1 | 7/2004 | Chen | |
| 2005/0084082 A1 | 4/2005 | Horvitz | |
| 2006/0232429 A1 | 10/2006 | Gonzalez | |
| 2007/0060054 A1 | 3/2007 | Romesburg | |
| 2007/0300302 A1 | 12/2007 | Morin | |
| 2008/0284587 A1 * | 11/2008 | Saigh | H04M 1/72424 340/539.13 |
| 2013/0116578 A1 | 5/2013 | An | |
| 2013/0336473 A1 | 12/2013 | Xu | |
| 2013/0346408 A1 | 12/2013 | Duarte | |
| 2014/0244714 A1 | 8/2014 | Heiby | |
| 2016/0005292 A1 | 1/2016 | Carroll | |
| 2016/0018969 A1 | 1/2016 | Sundarraman et al. | |
| 2016/0132046 A1 | 5/2016 | Beoughter | |
| 2017/0278370 A1 * | 9/2017 | Kaib | G16H 40/67 |
| 2018/0033279 A1 | 2/2018 | Chong | |
| 2018/0108236 A1 | 4/2018 | Kanukurthy et al. | |
| 2020/0169452 A1 * | 5/2020 | Yamada | G06N 20/00 |

FOREIGN PATENT DOCUMENTS

| | | |
|---|---|---|
| CN | 203455924 | 2/2014 |
| CN | 203547798 | 4/2014 |
| CN | 104219341 | 12/2014 |
| CN | 204348026 | 5/2015 |
| CN | 106899949 | 6/2016 |
| CN | 205428136 | 8/2016 |
| CN | 105979395 | 9/2016 |
| CN | 108490468 | 9/2018 |
| DE | 29718176 | 1/1998 |
| EP | 1074957 | 2/2001 |
| EP | 1522918 | 4/2005 |
| JP | 2004-153768 | 5/2004 |
| WO | WO 1994-022118 | 9/1994 |
| WO | WO 2001-049169 | 7/2001 |
| WO | WO 2001-075653 | 10/2001 |
| WO | WO 2008-079340 | 7/2008 |
| WO | 2017223367 A1 | 12/2017 |
| WO | WO 2017-223438 | 12/2017 |

* cited by examiner

Adjust Notifications for Visor Up

| | | | |
|---|---|---|---|
| Type of Adjustment | ◉ Defer | ○ Redirect | ○ Broadcast | ○ Prevent |
| Which Recipients? | ◉ One | ○ Some... [Select...] | ○ All | |
| For how Long? | ◉ Minutes [10] | ○ Hours/Days [Select...] | ○ Forever | |
| Which Locations? | ◉ One | ○ Some... [Select...] | ○ All | |

[View/Edit Previous Adjustment] — 605

[Apply] [Cancel]

FIG. 6

Adjust Notifications for Visor Up - Suggestion

822 — Type of Adjustment   ◉ Defer   ○ Redirect   ○ Broadcast   ○ Prevent

Suggested Adjustment
Based on Response History — 824

826 — Which Times/Days?  [Edit...]

826 — Which Locations?  [Edit...]

```
8 pm
6 pm
4 pm
2 pm
12 pm
10 am
8 am
     Location A-1  Location A-2  Location B  Location C  Location D
```

[View/Edit Previous Adjustment]   [Cancel]   [Next >]

FIG. 9

ADAPTIVE NOTIFICATION SYSTEM BASED ON CONTEXTUAL INFORMATION

CROSS REFERENCE TO RELATED APPLICATIONS

This application is a national stage filing under 35 U.S.C. 371 of PCT/IB2019/060128, filed Nov. 25, 2019, which claims the benefit of U.S. Application No. 62/776,573, filed Dec. 7, 2018; and of U.S. Application No. 62/826,041, filed Mar. 29, 2019, the disclosure of which is incorporated by reference in its/their entirety herein.

TECHNICAL FIELD

The present disclosure relates to systems and methods for managing and delivering safety notifications to workers adaptable by workers' states.

BACKGROUND

When working in areas where there is known to be, or there is a potential to be, dusts, fumes, gases, airborne contaminants, fall hazards, hearing hazards or any other hazards that are potentially hazardous or harmful to health, it is usual for a worker to use personal protective equipment (PPE), such as respirator or a clean air supply source. When safety-critical events (e.g., visor up, worker falls, etc.) occur in the areas, safety notifications need to be delivered to workers.

SUMMARY

There is a desire to effectively manage and deliver notifications to workers wearing personal protective equipment (PPE) in a work environment. The present disclosure provides adaptive systems and methods for managing and delivering notifications to workers based on contextual information.

In one aspect, the present disclosure describes a method of managing and delivering notifications to a worker in a work environment. The method includes providing to a notification system a set of current safety notification configurations; receiving, via the notification system, contextual information including real-time information collected from one or more environmental sensors and user sensors; and assessing, via the notification system, the contextual information to determine adjustments to the current safety notification configuration. In some embodiments, the method further includes adjusting, via the notification system, the current notification configuration based on the assessment, providing prompts for adjustment recommendations to guide a user to adjust the current notification configuration, or providing data-driven adjustment recommendations in response to a user's attempt to adjust the safety notification configuration.

In another aspect, the present disclosure describes a safety notification system embodied on a computer-readable storage medium. The system includes a data interface component to receive first contextual information from one or more environmental sensors and user sensors and second contextual information from one or more wearable notification and response devices; an assessing component to assess the first and second contextual information to determine whether to adjust current safety notification configurations; an adjusting component to adjust the current safety notification configurations based on the contextual information to generate adjustment recommendations; a user interface to present the adjustment recommendations to a user and receive and send the user's instructions to the assessing component and the adjusting component to generate a notification; and a delivery component to deliver the notification to the wearable notification and response devices.

Various unexpected results and advantages are obtained in exemplary embodiments of the disclosure. Advantages of exemplary embodiments of the present disclosure include, for example, fewer missed notifications due to worker state or environmental conditions, decreased risk of a notification causing harm by interrupting a worker at an inopportune time, and decreased nuisance notifications delivered at times a worker is unable to respond. In addition, adaptive methods and systems described herein can provide relatively conservative modifications to a notification system.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 6 illustrates a screenshot of a user interface (UI) generated by an intelligent assistant of a notification system for prompting a user to adjust notifications, according to one embodiment.

FIG. 9 is a screenshot of a UI or dashboard generated by an intelligent assistant of a notification system to show history data and recommendations for a user to adjust notifications, according to one embodiment.

Figure 1:
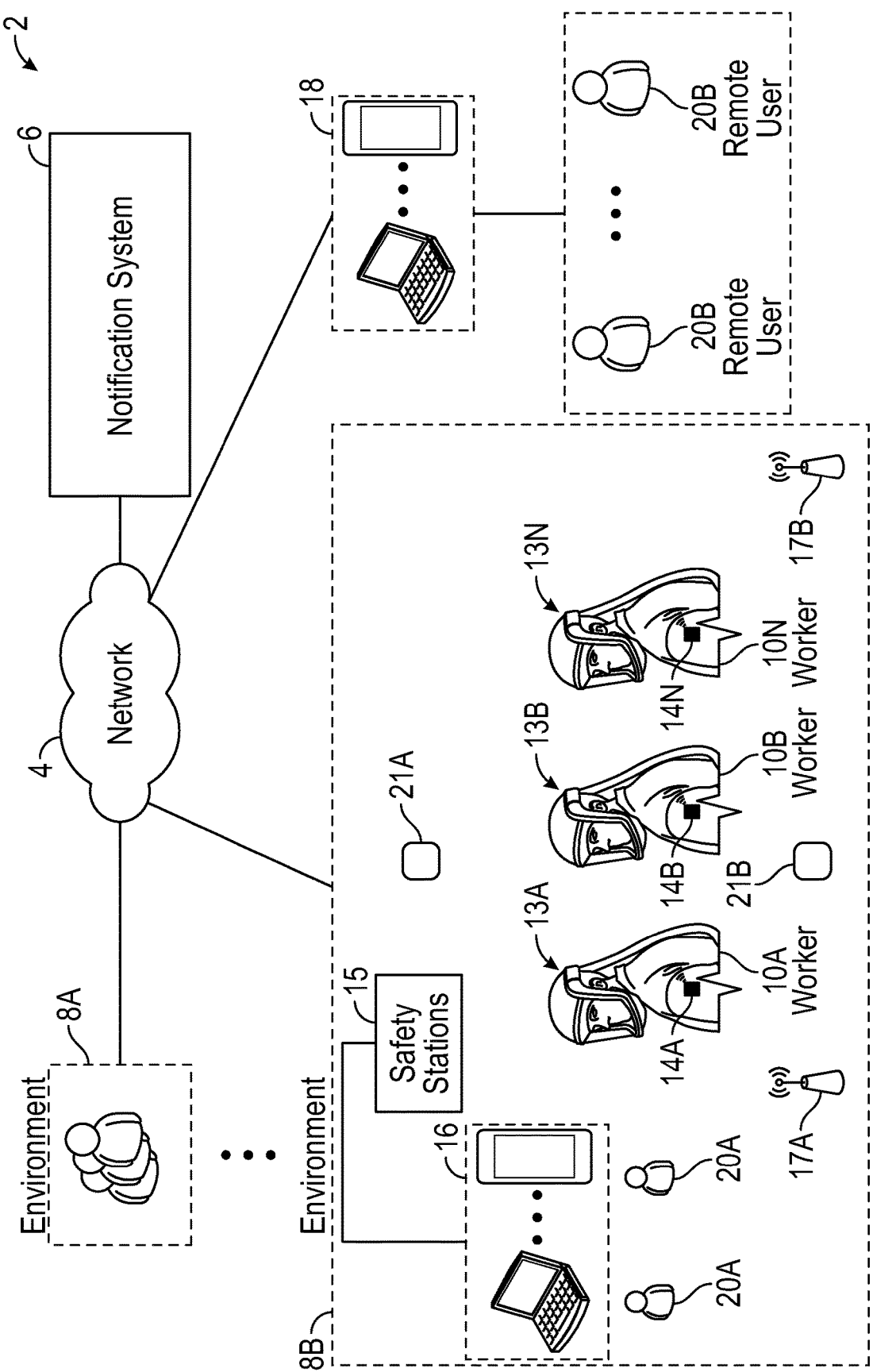
FIG. 1 is a block diagram illustrating an exemplary notification system to deliver safety notifications to workers wearing personal protection equipment (PPE) in a number of work environments, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides notification systems and methods for notifying a user wearing personal protection equipment (PPE) in a work environment when there is any meaningful event (e.g., a safety issue, a supervisor's instruction, etc.) in the work environment.

FIG. 1 is a block diagram illustrating an exemplary notification and response management system 2 in which articles of personal protection equipment (PPE) are utilized within a number of work environments. Notifications to be delivered to workers wearing the articles of PPE are managed by a notification system 6, according to some embodiments. Each of physical environment 8A and 8B represents a physical environment, such as a work environment, in which one or more individuals, such as workers 10A-10N, utilize respective personal protection equipment (PPE) 13A-13N while engaging in tasks or activities within the respective environment. Each article of the PPE may include embedded sensors or monitoring devices and processing electronics configured to capture data in real-time as a user (e.g., a worker) engages in activities while wearing the PPE. Each article of the PPE may further include one or more output devices for outputting data that is indicative of operation of the PPE and/or generating and outputting communications to the respective worker 10A-10N. For example, the PPE may include one or more devices to generate audible notification (e.g., one or more speakers), visual notification (e.g., one or more displays, light emitting diodes (LEDs) or the like), or tactile notification (e.g., a device that vibrates or provides other haptic notification).

Each PPE is configured to communicate data, such as sensed motions, events and conditions, via wireless communications. The PPE 13A-N may, for example, communicate directly with a wireless access point. As another example, each worker 10A-N may be equipped with a respective one of wearable communication hubs 14A-N that enable and facilitate communication between the PPE 13A-N and the notification system 6.

In addition, an environment, such as environment 8B, may also include one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to the notification system 6. As such, the notification system 6 may be configured to correlate the sense environmental conditions with the particular regions and, therefore, may utilize the captured environmental data when processing event data received from PPE 13. For example, the notification system 6 may utilize the environmental data to aid generating alerts or other instructions for respirators 13 and for performing predictive analytics, such as determining any correlations between certain environmental conditions (e.g., heat, humidity, visibility) with abnormal worker behavior or increased safety events. As such, the notification system 6 may utilize current environmental conditions to aid prediction and avoidance of imminent safety events. Example environmental conditions that may be sensed by sensing stations 21 include but are not limited to temperature, humidity, presence of gas, pressure, visibility, wind and the like.

Each of environments 8A-B can include computing facilities (e.g., a local area network 4) by which the articles of PPE are able to communicate with notification system 6. The notification system 6 can provide data acquisition, monitoring, activity logging, reporting, predictive analytics, PPE control, alert generation, etc. The environments 8A-B, may also include one or more safety stations 15 distributed throughout the environment to provide viewing stations for accessing information, such as requirements for the PPE. In addition, each of environments 8 may include computing facilities that provide an operating environment for end-user computing devices 16, 18 for interacting with the notification system 6 via network 4. For example, each of environments 8 typically includes one or more safety managers responsible for overseeing safety compliance within the environment. Local users 20a and remote users 20b can interact with the notification system 6 to control and actively manage many aspects of safety notification to be delivered to the workers 10A-B, such as accessing and viewing usage records, reporting, etc.

In some embodiments, the notification and response management system 2 can include one or more notification delivery components or devices for each PPE to output communications to the respective worker 10A-10N. Typical notification delivery components/devices may include, for example, a wearable vibration device or a light emitting device connected to a wearable hub that can alert workers when certain information is to be delivered to the workers. The typical notification delivery means may include, for example, audible notification (e.g., a speaker), visual notification (e.g., a LED), tactile notification (e.g., vibration), etc.

This disclosure describes systems and methods for receiving contextual or circumstantial information in work environment (e.g., work environment 8A, 8B in FIG. 1) and using the information to control when, what and how to send notifications to selected users (e.g., one or more workers 10A-N in FIG. 1) in the work environment. The contextual information may include, for example, dynamic information gathered from environmental sensors (e.g., sensing stations 21A, 21B in FIG. 1) and user wearable sensors (e.g., sensors of the PPE in FIG. 1), which can be assessed under the limitation of pre-set policies (e.g., safety policies or rules) applied to a notification system (e.g., the notification system 6 in FIG. 1). In some embodiments, a notification system described herein can have an intelligent assistant implementing a machine learning process to generate notification configuration adjustments based on the contextual information or variables. In some embodiments, the intelligent assistant can flexibly use various measures of success (e.g., a reinforcement in certain machine learning systems) to automatically adjust the notification configuration or provide adjustment recommendations to a user (e.g., a supervisor or a safety manager) to adjust the notification configuration.

Figure 2:
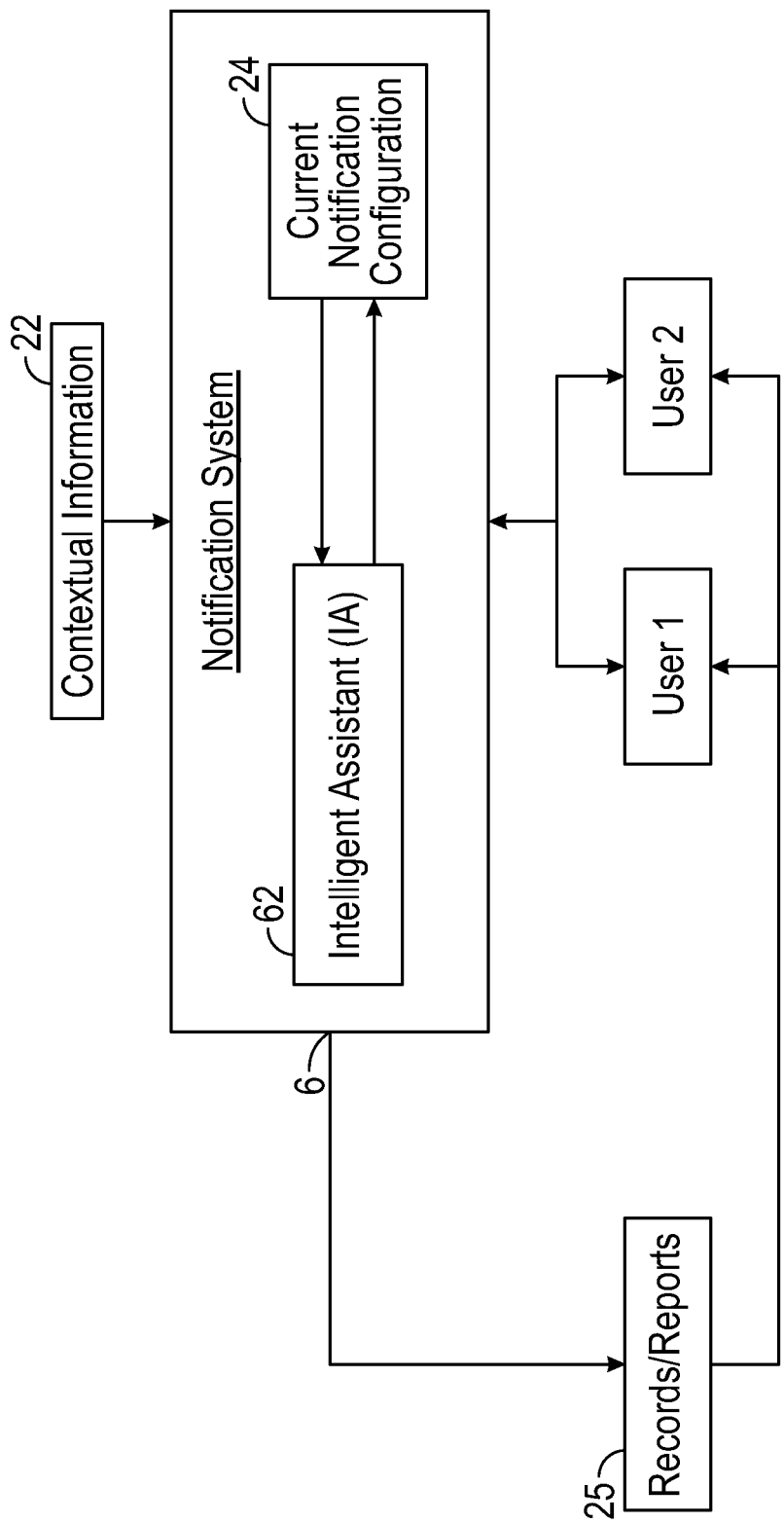
FIG. 2 is block diagram illustrating a method of using a notification system to manage and deliver notifications, according to one embodiment.

FIG. 2 is a block diagram illustrating a method of using a notification system 6 including an intelligent assistant 62 to manage and deliver notifications, according to one embodiment. The notification system 6 includes an intelligent assistant 62 to provide guidance to a user (e.g., a supervisor or a safety manager) to adjust a notification configuration based on contextual information or variables. The intelligent assistant 62 may also automatically adjust notification configurations within policy limits without first notifying the user (e.g., a supervisor or safety manager) to reduce over-notification or increase worker response rate.

In some embodiments, the intelligent assistant 62 can be fulfilled by implementing, via a microprocessor device, a machine learning process including, for example, one or more descriptive or predictive statistics methods including a multiple regression algorithm or an analysis of variance algorithm on the contextual information. It is to be understood that an intelligent assistant may include any suitable machine learning algorithms. Variables such as, for example, worker's locations, time of day, etc., and their respective data (e.g., history data or current state data) can be provided to the learning algorithm such that the intelligent assistant can generate explanations or predictions for notification configuration adjustments. FIGS. 6-11 illustrate screenshots of user interfaces or dashboards for various notification configuration adjustments generated by the intelligent assistant 62 or by an interaction between the intelligent assistant 62 and a user, which will be discussed further below.

The contextual information or variables at 22 can include real-time information collected from one or more work environments. For example, an article of PPE can include sensors for capturing data that is indicative of a user's attributes such as, for example, aspects of biological state, psychological state, personality traits, and the current demands on the user's perceptual systems including different modalities such as, for example, visual and auditory systems. When a user is in motion they are likely to have different thresholds for detecting notifications as compared to when they are stationary. A user's motion information can be critical for a notification system to determine how to deliver suitable notifications. In some embodiments, an accelerometer can be used to detect a user's motion. In other embodiments, dedicated motion sensors for measuring a user's movement may not be required. Instead, sensors already in place in a product system may be repurposed for detecting motion. The user's motion information can then be used by a notification system for managing and delivering notifications as specified in the corresponding notification configuration. In some embodiments, one or more temperature measurement devices can be provided to detect a user's body temperature which may provide information, when combined with other biological measurements (e.g., galvanic skin response), indicating the physical, emotional, or engagement state of the user.

The real-time information collected from the work environment can further include measures of variables in a work environment external to a user. For example, in a condition of heat stress in the work environment, factors that are relevant to heat exposure in the work environment including air temperature, humidity, air velocity, heat radiation, etc., can be detected by various sensors distributed in the work environment. Such environmental measurement data can be transmitted to a notification system and used to initiate or modify notifications regarding heat stress. In some embodiments, a location sensor such as environmental location beacons (e.g., beacons 17A-B of FIG. 1), can be provided to detect a user's location information which can be analyzed to determine an indication of a user's state. For example, the location information of a worker can be used to cancel a notification when the intelligent assistant analyzes the location information and determines that the notification is not relevant to the detected location but is relevant to another location. The cancellation of delivering a notification can be implemented by adjusting a notification configuration that can specify a notification for one location but not another location. In some embodiments, the detected location information can also be used to initiate a notification. For example, when a location sensor detects a worker walking by a relevant landmark, such as a worker's interface for receiving notification information, the location information can be transmitted to the notification system and the intelligent assistant can analyze the location information and send the worker suitable notifications such as, for example, a reminder to complete a task (e.g., responding to checking previous notifications). It is to be understood that the sensors suitable for providing environmental measures may vary based on the needs of various work environments.

Figure 5A:
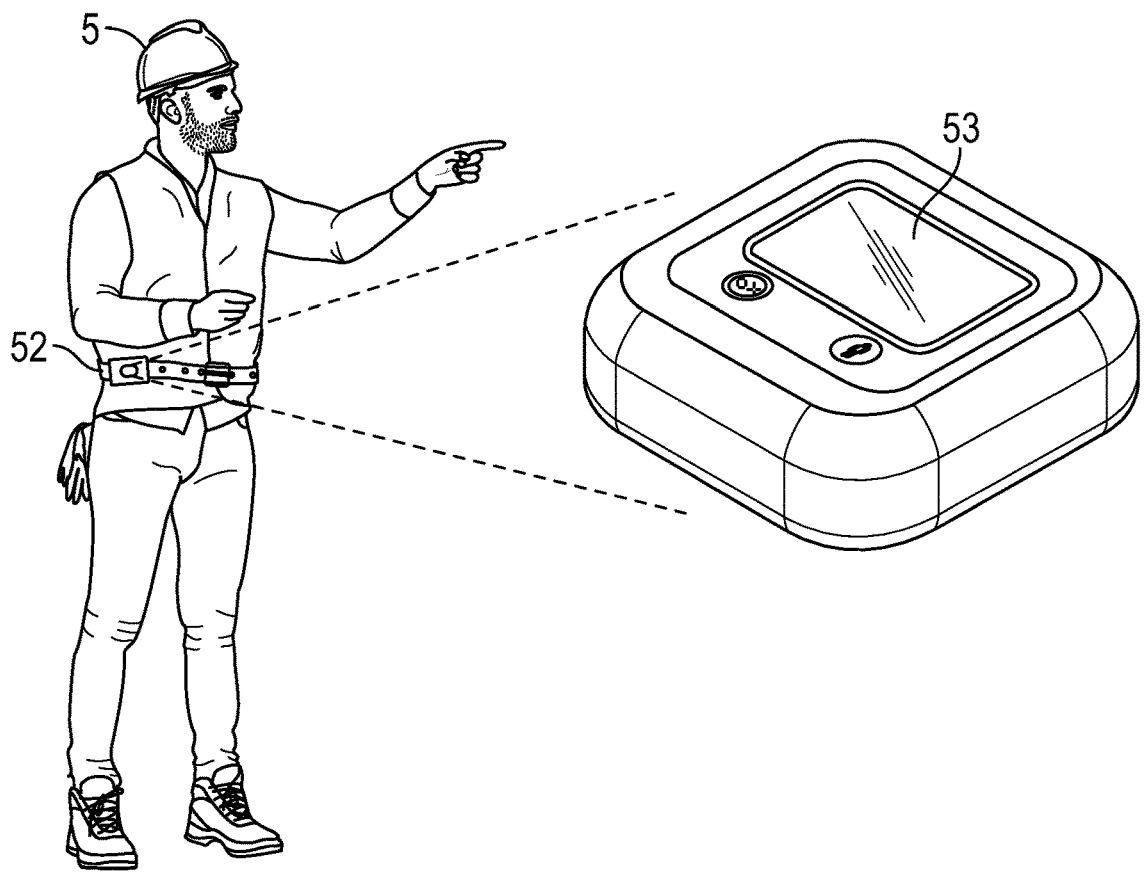
FIG. 5A illustrates a schematic view of a wearable notification and response device, according to one embodiment.
Figure 5B:
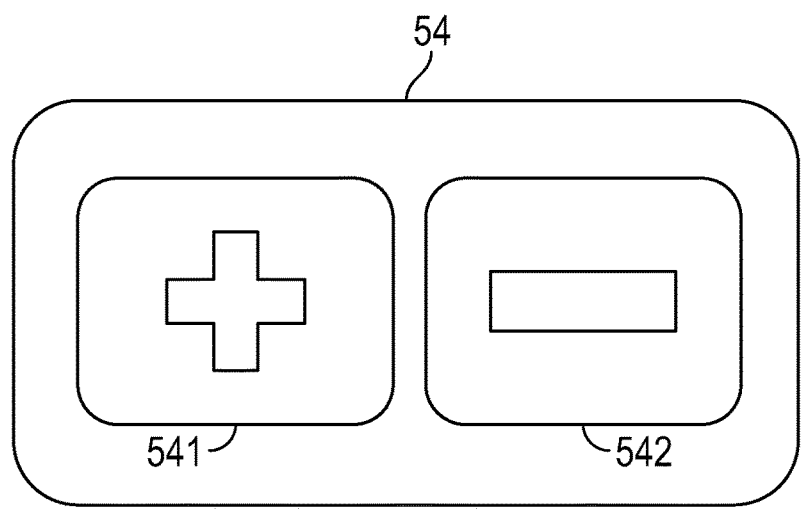
FIG. 5B illustrates a user interface of a notification and response device, according to another embodiment.
Figure 5C:
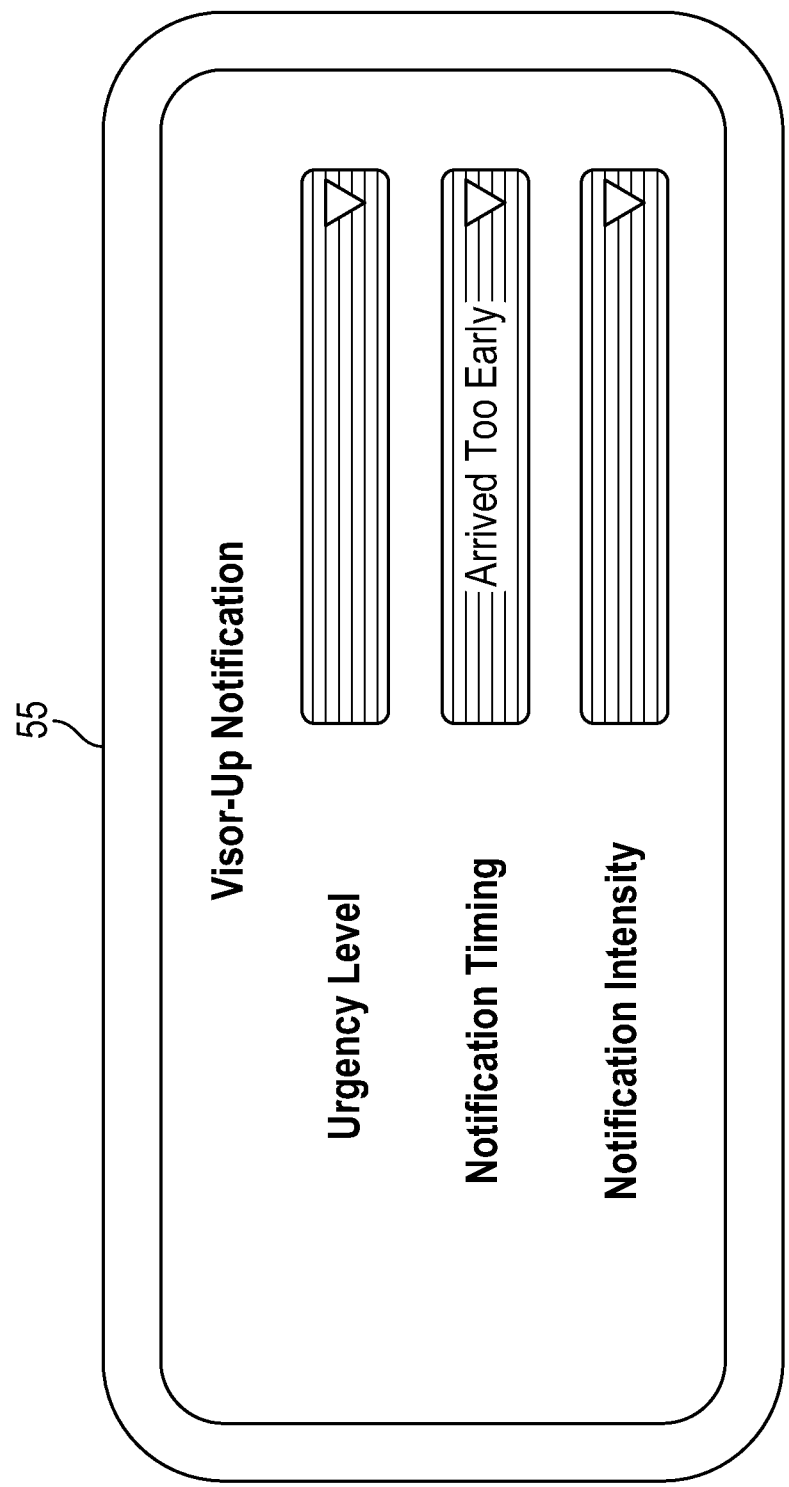
FIG. 5C illustrates a user interface of a notification and response device, according to one embodiment.

The real-time information collected from the work environment can further include a user's feedback to notifications. A user (e.g., a worker) can provide feedback by using a user response device, which can include, for example, a wearable device, a safety station, or any suitable input devices that can provide a user interface for the user to input feedback. FIGS. 5A-C illustrates various exemplary user response devices or user interfaces that allow a user to provide feedback at different sophistication levels, which will be discussed further below.

In some embodiments, the contextual information or variables 22 can be combined with user history data and assessed by the intelligent assistant 62. User history data may include, for example, history data of notifications sent to a user, history data of user response to the notifications, etc. Notification history data can be stored by the notification system and utilized by an intelligent assistant of the notification system to adjust notification configurations. For example, in some embodiments, the intelligent assistant can analyze the user history data to defer or cancel certain notifications to prevent too many notifications occurring within a certain timeframe. In some embodiments, the intelligent assistant can analyze the user history data to determine whether notifications are safety critical or not. For notifications that are not safety critical (e.g., just informative), the intelligent assistant can adjust the current notification configuration to defer or cancel the notification to prevent annoyance and distraction to a user, while for a safety-critical notification the intelligent assistant can offer a higher priority and adjust the notification accordingly to ensure its delivery to the user.

The intelligent assistant 62 of the notification system 6 receives the contextual information 22 and assesses the received information along with user history data and pre-set policies or rules to determine whether to adjust or update a current notification configuration 24 that the notification system 6 has access to.

A notification configuration described herein includes various notification rules and parameters that can define or specify what, when, how, and to whom a notification generated by the notification system 6 is to be delivered upon detecting a meaningful event (e.g., a safety issue, a supervisor's instruction, etc.) in the work environment. For example, a notification configuration may specify an intensity, a frequency, or a modality to deliver a notification. In some embodiments, a notification configuration may specify rules or parameters for escalating a notification that a worker is not responding to, such as increases in frequency, duration, and intensity of a notification, and changes in modalities or additions of modalities. In some embodiments, a notification configuration may specify rules or parameters for broadcasting a notification that a worker has not responded to.

A notification configuration may have initial settings for its rules and/or parameters that can be adjusted manually by a user or automatically by the intelligent assistant 62. The initial configuration can be set-up for a specific work context upon installation of the notification system in that context including worker IDs, PPE IDs, work environment sensor IDs, etc. Upon specifying workers and PPE, for example, a notification configuration may be set to send notifications to a worker when PPE is used beyond a specified use duration, regardless of a work zone. Later, a notification configuration may be adjusted to account for distances between a work zone and replacement parts, for example, specifying earlier notifications for workers who are at a longer distance from replacement parts.

In some embodiments, the intelligent assistant 62 of the notification system 6 can use a machine learning method such as, for example, a reinforcement learning algorithm to improve a decision-making process of the intelligent assistant 62. In some embodiments, to initiate a reinforcement learning process, the notification system can begin by using default notification parameters for the current notification configuration for specific events and send a pre-set notification to a user, while learning from user responses or reinforcement. Over time, the notification system 6 can determine whether the default notification parameters of the current notification configurations need to be adjusted, for example, whether the current notification configuration results in an acceptable level of worker response, considering the contextual information collected from the work environment along with the user history data and pre-set policies. This learning process can occur over time and with many instances of each event.

In some embodiments, when the notification system 6 accumulates experiences after learning about the contextual variables, the notification system 6 can generalize such experiences across events. For example, in some cases, when the notification system 6 assesses the contextual information and finds that a value of one variable (e.g., accelerometer indicated movement) predicts a decrease of a user's response sensitivity across all events, the notification system 6 can adjust or update the current safety notification configurations to increase notification intensity for all events.

In some embodiments, the notification system 6 can utilized a reinforcement learning algorithm to lock the system behavior to the current safety notification configurations until the notification system 6 determines that sufficient contextual information data have been gathered to provide a given level of certainty. This can prevent premature changes to the current safety notification configurations. The notification system described herein may begin with a relatively simple set of notification configuration which can continually adapt and improve its behavior over time.

In some embodiments, a reinforcement learning algorithm can include various parameters to control the learning rate of the algorithm (e.g., the rate of adapting the current safety notification configurations). For example, for a notification system to deliver safety notifications, the default learning rate can be relatively slow, and may require relatively larger sample sizes to modify the weightings of different contextual variables. The reinforcement learning algorithm can generalize by applying adjustments to a broader set of contexts, depending on sample sizes, but may have some bias to be cautious in generalizing.

When the notification system 6 determines to adjust at least some notification parameters/variables from the current notification configuration 24, the intelligent assistant 62 can generate adjustment recommendations (e.g., options or alternatives for notifications) within the set notification policies, or provide suggestions for a user instructing the system to make an adjustment (e.g., user 1 as a supervisor, user 2 as a safety manager, or other user(s) having the authority to adjust notifications). The intelligent assistant 62 can also update the current notification configuration 24 based on the received user's instructions. In some embodiments, the intelligent assistant 62 can evaluate the instructions from the user based on the contextual information 22. When the intelligent assistant 62 determines that the instructions from the user are inappropriate, the intelligent assistant 62 can provide further guidance for the user. The results of the interactive behavior between the intelligent assistant 62 and the user can be recorded in a form of reports 25 for the reference of the user or organizations.

Figure 3A:
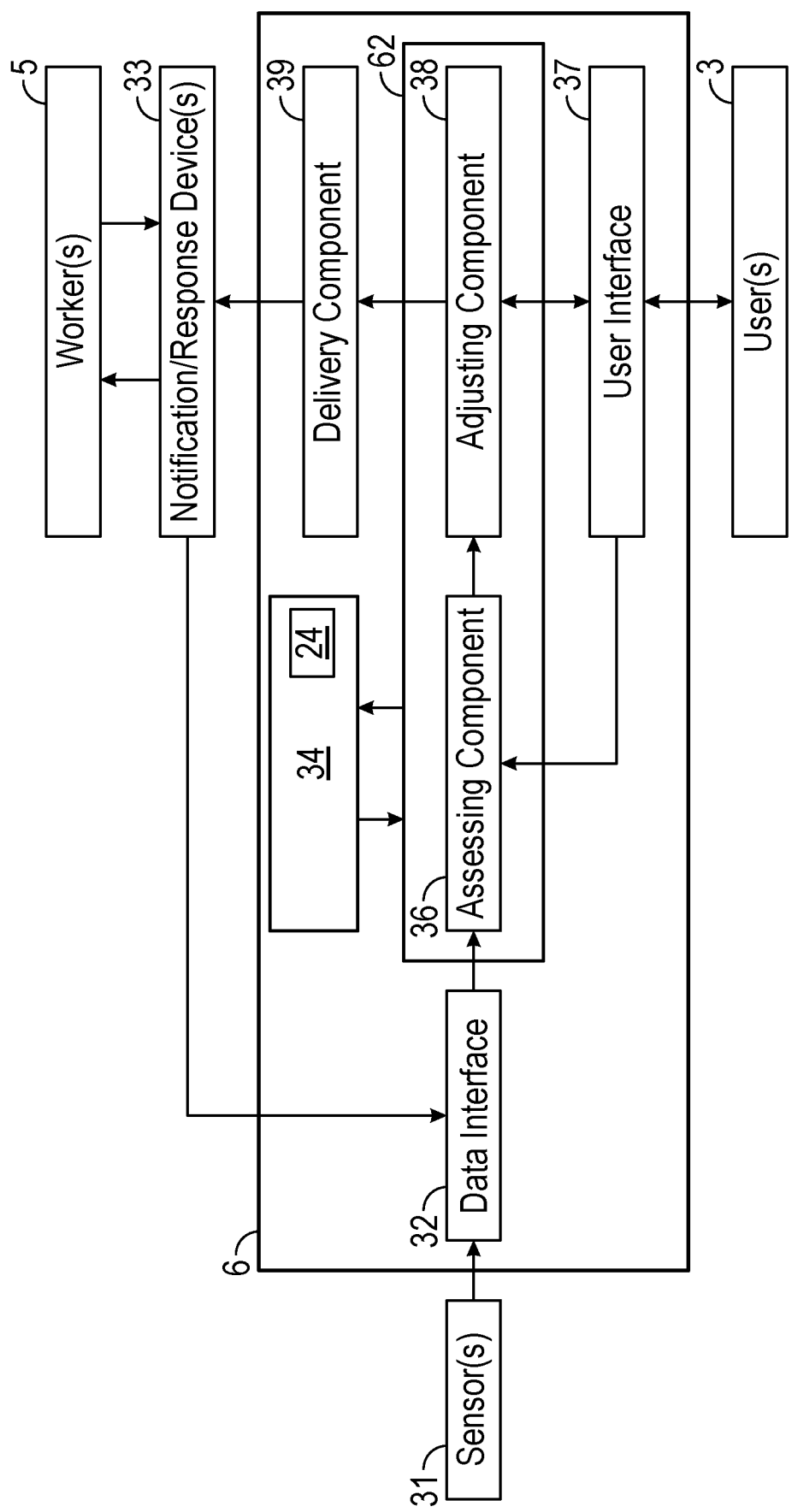
FIG. 3A is a block diagram of the notification system of FIG. 2, according to one embodiment.

FIG. 3A is a block diagram of the notification system 6 including the intelligent assistant 62 of FIG. 2, according to one embodiment. The notification system 6 includes a data interface component 32 configured to receive measurement data from various sensors 31 including, for example, environmental sensors and worker wearable sensors. The data interface component can also receive data from one or more notification and response devices 33. A worker 5 can receive notifications from the notification and response devices 33 and may provide feedback to the notification system 6 via the devices 33. In some embodiments, the devices 33 can be a wearable hub and the worker 5 can initiate messages (e.g., alarms) via the wearable hub. The worker-initiated messages can be sent to the notification system and received by the data interface component.

The notification system 6 further include a store component 34 to store information including, for example, user history data, pre-set policies, dynamically-updated current notification configurations, etc. The pre-set policies can be pre-determined for various events that may occur in a work environment. For example, a user operating the system can set a rule that any detection of a worker wearing a wrong filter in a work environment is an urgent event.

In the depicted embodiment of FIG. 3A, the intelligent assistant 62 of the notification system 6 includes an assessing component 36 and an adjusting component 38. The assessing component 36 is configured to assess the contextual information or variables from the data interface 32 along with other information from the store component 34 to determine whether to adjust current notification configurations. The adjusting component 38 is configured to make suitable adjustments of notifications from the current notification configuration 24 based on the assessing results from the assessing component 36. For example, in some embodiments, the assessing component 36 can assess the real-time contextual information from the data interface 32 and the related pre-set rule from the store component 34 to determine an urgency level of notifications upon certain detected events in the work environment. Based on the assigned urgency level, the adjusting component 38 can determine appropriate notification modifications/adjustments, for example, to adjust (increase or decrease) detectability of the notification received by worker(s) 5.

The adjusted notifications or adjustment recommendations can be presented to user(s) 3 via a user interface 37. In some embodiments, the user interface 37 may include a dashboard providing data visualization of proposals (e.g., to increase or decrease detectability) to the user 3 (e.g., a supervisor or a safety manager) to manually input instructions. The input from the user 3 can be assessed by the assessing component 36 to determine whether further adjustments can be made. Accordingly, the adjusting component 38 can further adjust the notification and provide further proposal or guidance to the user 3 via the user interface 37. In some embodiments, the user 3 may have the authority to override the proposal from the intelligent assistant 62. The finally-determined notification adjustment according to the user's instructions can be sent to the delivery component 39 and delivered to worker(s) 5 via notification and response device(s) 33. In some embodiments, a worker's feedback can be received by the notification and response device 33 and sent to the data interface 32 as additional contextual information.

Figure 3B:
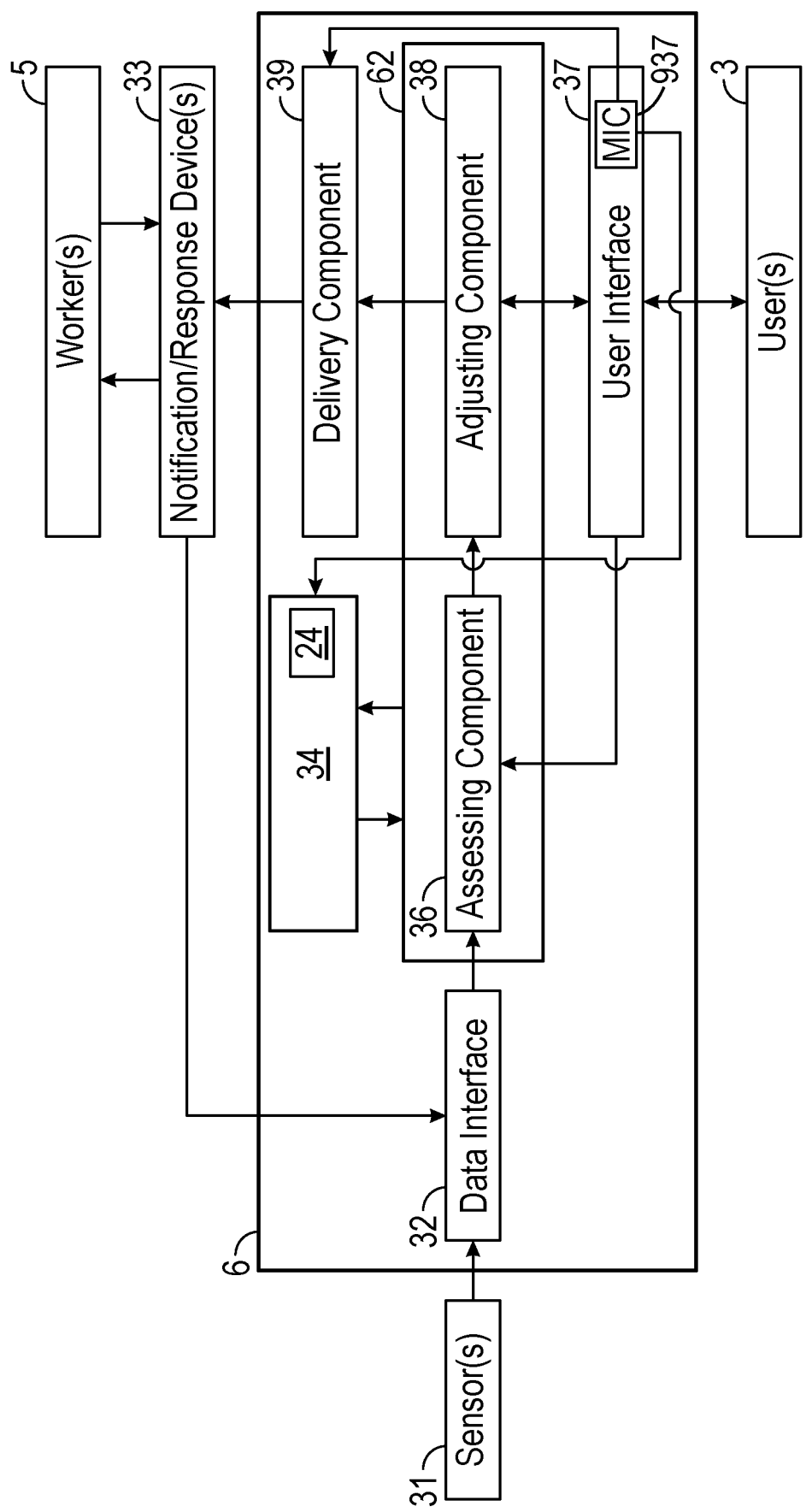
FIG. 3B is a block diagram of the notification system of FIG. 2, according to another embodiment.

In some embodiments, the notification system 6 may allow the user 3 (e.g., a supervisor) to bypass an intelligent assistant to initiate notifications to send to the workers 5. In the depicted embodiment of FIG. 3B, the user interface 37 includes a message initiation component (MIC) 937 which is configured to receive specific instructions from the user 3 (e.g., a supervisor) and direct the message/notification from the user 3 to the worker 5 via the delivery component 39, bypassing the intelligent assistant 62. Such user data can be sent to and stored in the store component 34 via the message initiation component (MIC) 937, bypassing the intelligent assistant 62.

In some embodiments, the intelligent assistant 62 can analyze the user data stored in the store component 34, detect a behavior pattern of the user data from MIC 937, and propose modifications to the notification configuration accordingly.

In some embodiments, the message initiation component (MIC) 937 can be separate from the user interface 37 and independently executed by a device such as, for example, a mobile device capable of receiving a voice input. The device may not require dashboard-kind of view and analysis.

Figure 3C:
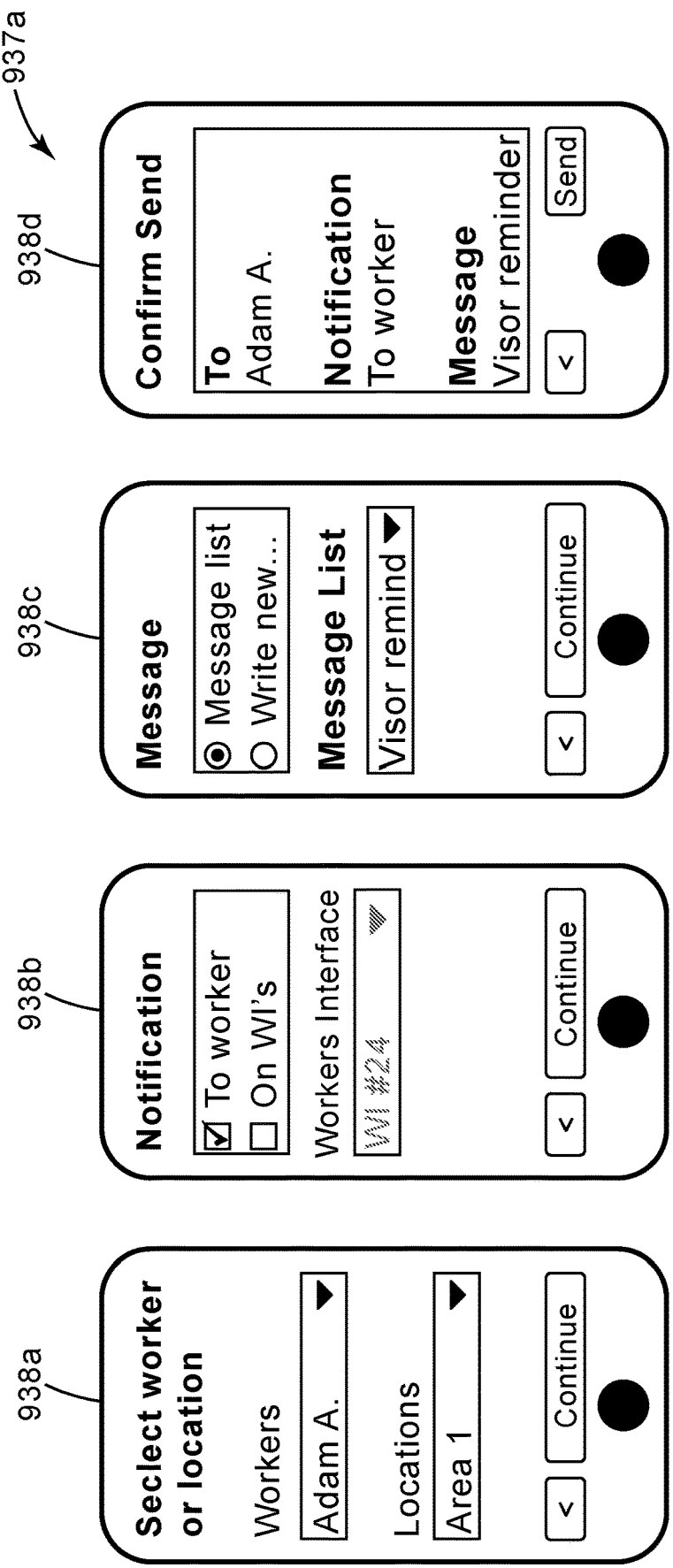
FIG. 3C illustrates a screenshot of an exemplary message initiation component (MIC), according to one embodiment.

FIG. 3C illustrates a screenshot of an exemplary message initiation component (MIC) 937*a*, according to one embodiment. The message initiation component (MIC) 937*a* provides various selectable dialog boxes 938*a-d* which allow the user to specify a notification to be sent to a worker, including, for example, when to send the notification, what is the content of the notification, how to send the notification, to whom the notification is to be sent, etc.

The notification system 6 can be embodied on a computer-readable storage medium. The computer-readable storage medium can store instructions for performing the methods or processes described herein. The computer-readable storage medium may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

The notification system 6 can be implemented by a processor or a computing device including, for example, one or more general-purpose microprocessors, specially designed processors, application specific integrated circuits (ASIC), field programmable gate arrays (FPGA), a collection of discrete logic, and/or any type of processing device capable of executing the techniques described herein.

Figure 4:
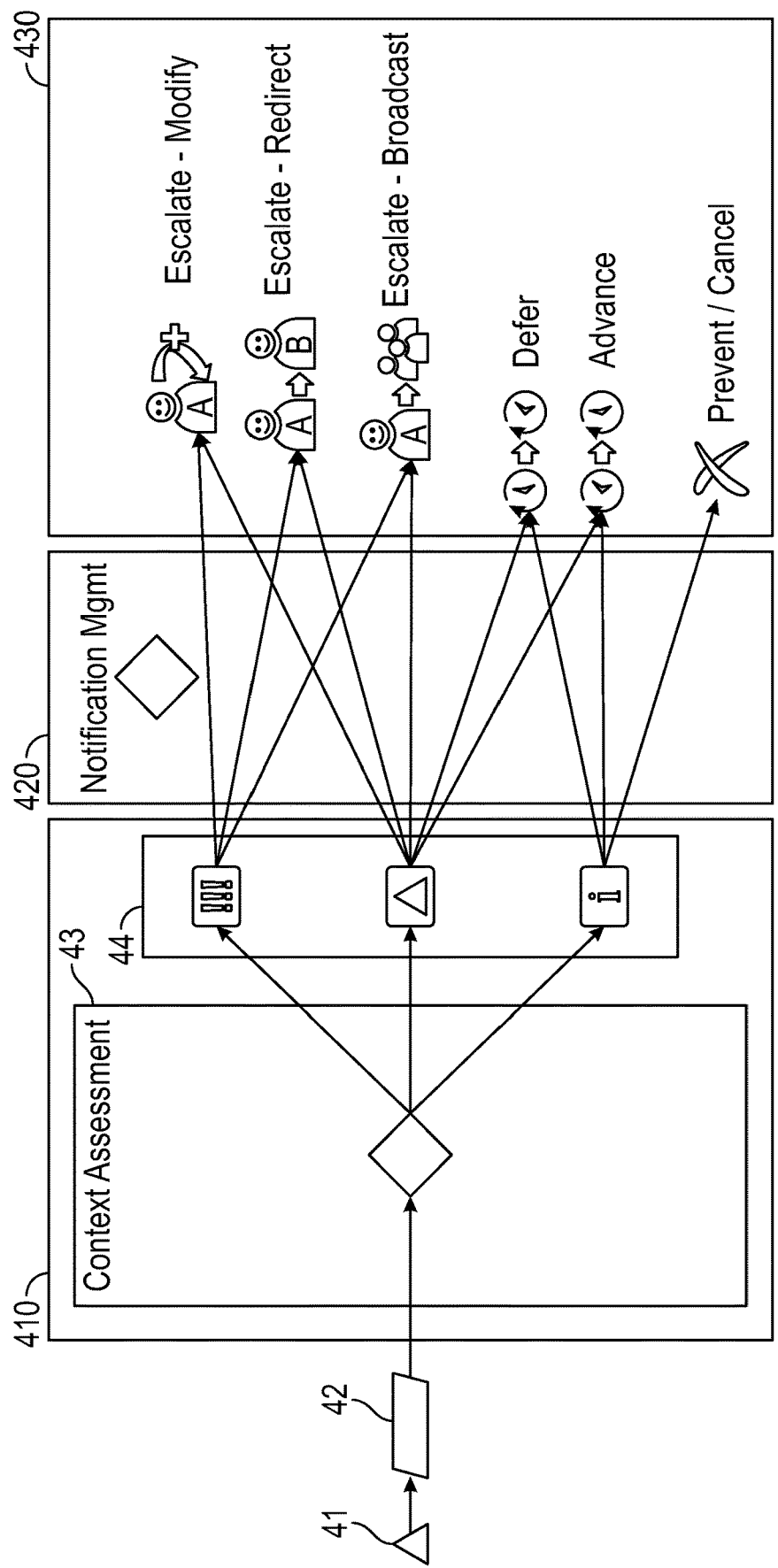
FIG. 4 is a schematic diagram illustrating a method of automatically managing and delivering safety notifications to a user in work environments, according to one embodiment.

FIG. 4 is a schematic diagram illustrating a method of automatically managing and delivering safety notifications to a user in various work environments, according to one embodiment. Event(s) 41 that occur in a work environment can be detected by various sensors which can generate real-time contextual information 42. A notification system can assess at 410 the real-time contextual information by considering at 43 pre-set policies and user's history data and current state data to determine the urgency level 44 of the detected events 41. The urgency level 44 can vary as, for example, highly urgent, urgent, non-urgent or informative. With the determined urgency level 44, the notification system can determine at 420 appropriate notification modifications 430 (e.g., to adjust detectability).

In some embodiments, options for adjusting detectability of a notification may include, for example, escalating the delivery of notification, deferring notification, advancing notification, preventing or cancelling notification, etc. In some embodiments, when the notification system determines an event to be highly urgent, the notification system can escalate delivery of the notification. For example, in some embodiments, the perceptual qualities of the notification can be modified to increase saliency. In some embodiments, detectability of a notification can be modified by increasing the intensity or volume of a notification delivery device. In some embodiments, the notification can also be escalated by redirecting, for example, forwarding the notification to another relevant user in the work environment who may be more available to respond. In some embodiments, the notification can also be escalated by broadcasting, for example, sending the notification to the target user along with other relevant users in the work environment.

When the notification system determines an event to be non-urgent or just informative, the notification system may defer, advance, prevent, or cancel the notification. In some embodiments, when the notification system determines that the trigger event for a notification is non-urgent, and/or the worker is at a particularly tricky step in a task, the notification system can defer or cancel the notification. In some embodiments, notification modifications may advance a non-urgent notification by moving the notification forward by reducing allowable delay time.

In some embodiments, the notification system may use a conservative strategy to substantially obey pre-set policies to guarantee a certain level of successful notifications in a given situation. For example, when a notification for a certain event (e.g., a low battery status of PPE) has a response rate lower than a pre-set threshold, the notification system can keep modifying the notification (e.g., by increasing notification intensity) over successive episodes until the response rate reaches a pre-set threshold. In many cases, a response rate from a worker may depend on contextual variables such as, for example, the location of the worker. The notification system can gather adequate sample over time to determine the response rate as a function of contextual variables and adjust the notification accordingly.

In some embodiments, a notification system can provide the workers with notification and response devices having a basic feedback function such as, for example, acknowledge function or clear function. In some embodiments, a notification and response device may allow workers to provide more detailed feedback information to the system instead of a simple acknowledgment of receipt. In some embodiments, notification and response devices may allow workers to initiate messages (e.g., alarms).

FIG. 5A illustrates a schematic view of a wearable notification and response device allow a worker to respond to received notifications and/or to initiate messages (e.g., alarms), according to one embodiment. The wearable notification and response device 52 can include a vibration device or a light emitting device connected to a wearable hub that can alert workers when certain information is to be delivered to the workers. In the depicted embodiment of FIG. 5A, the wearable notification and response device 52 further includes a button 53 allowing the wearers to respond to notifications and/or initiate alarms from their current location. Upon receiving the alarms from the device 52, a notification system can identify relevant users (e.g., close-by workers, supervisors, safety managers, etc.) and send a high urgency notification to the relevant users via various notification and response devices. After initiating the alarm, the worker can access a safety station or other user interfaces to get feedback on the status of the alarm such as, for example, a user interface can present information on notification recipients, their locations, and any acknowledgements by the recipients.

FIG. 5B illustrates a schematic view of a notification and response device providing a two-button acknowledgment system, according to one embodiment. The device 54 includes a first acknowledgement button 541 and a second acknowledgement button 542. The first button 541 is to acknowledge the notification to be appropriate, which corresponds to acceptability of a notification. The second button 542 is to acknowledge the receipt of the notification and require adjustments of the received notification. Pressing either button can count as a response to a notification. A notification system can monitor a worker's response/feedback via the device 54 and use the feedback data along with other contextual information/variables to modify notification configurations. In some embodiments, a notification system may monitor a worker's response to determine whether a worker complies with the directive indicated by the notification, such as lowering a protective visor in an area with contamination or leaving an area for which their PPE is inappropriate. Managing such responses may be one of the primary functions of a notification system, and the direct feedback from the worker or the worker's history behavior concerning the notification can provide useful supplements.

In some embodiments, when the notification system determines that acceptability from workers is lower than a pre-determined threshold, to increase the acceptability, the system can modify the corresponding notification to decrease its urgency level. When the notification system determines that a response rate from workers is lower than a pre-determined threshold, to increase the response rate, the system can modify the corresponding notification to increase notification intensity. In some embodiments, the notification system may prioritize a response rate over acceptability. For example, the notification system may decide to stop modifying notification once a response rate reaches its threshold, even the acceptability is still lower that its threshold at that point.

In some embodiments, to further enhance a learning mechanism of a notification system, a user interface can be provided to receive workers' feedback including user's response and specific reason(s) for that response. FIG. 5C illustrates a screenshot of a user interface 55 of a notification and response device allowing more sophisticated feedback from workers, according to another embodiment. For example, a worker can press the second button 542 of FIG. 5B to request adjustments of a notification. Then, the user interface 55 can be provided to the worker to select possible reason(s) for this feedback (e.g., the notification sent too early or late, the notification intensity too strong or weak, urgency level inappropriate, etc.). The user's feedback via the user interface 55 can provide more detailed contextual information to the notification system to enhance its learning mechanism.

In addition, the notification system can use the more sophisticated user feedback to provide additional notification modifications. For example, in the embodiment depicted in FIG. 4, when the notification system receives a worker's feedback that a notification was sent too early or should not have been sent, the notification system can experiment with notification deferrals and cancellations at 430 if such adjustments are allowed by pre-set policies.

Figure 5D:
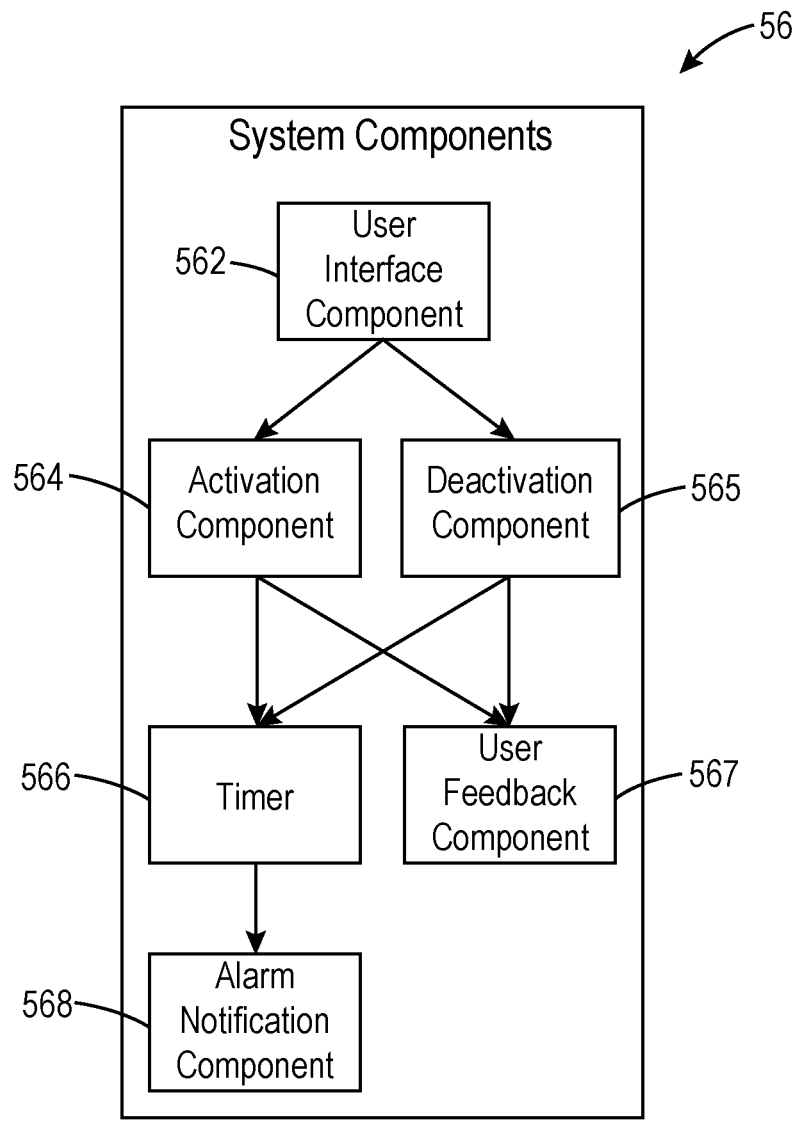
FIG. 5D illustrates a block diagram of an alarm initiation system, according to one embodiment.

In some embodiments, the wearable devices 52 can allow the worker 5 to initiate messages (e.g., alarms). The worker-initiated messages can be received by the wearable device 52, sent to the notification system 6 and received by the data interface component 32 of FIG. 3. FIG. 5D illustrates a block diagram of an exemplary alarm initiation system 56. The system 56 can be implemented by the wearable device 52 to allow a worker to initiate alarms. The system 56 includes a user interface component 562 to receive a worker's input (e.g., when the worker presses an alarm initiation button on the wearable device). In some embodiments, an alarm initiation button can be designed to allow a worker to activate it even with heavy duty gloves.

In some embodiments, a worker can press and hold an alarm initiation button for a predetermined period (e.g., 4 seconds, 5 seconds, 6 seconds, etc.) to activate an activation component 564 of the system 56. Upon detecting the press of the button, the activation component 564 can inform a timer 566 to start an alarm count-down. During a predetermined period of alarm count-down, an alarm notification component 568 of the system 56 can provide a pending-alarm feedback (e.g., a continuous vibration) to the worker who initiated the alarm that an alarm might be triggered. At the end of the alarm count-down, in the absence of receiving a worker's further instruction (e.g., another press of the button), the alarm notification component 568 of the system 56 can trigger an alarm to send to the data interface component 32 of the notification system 6 in FIG. 3A. During the predetermined period of alarm count-down, when the user interface component 562 receives instruction from the worker (e.g., another button press from the worker), a de-activation component 565 of the system can silence the vibration and cancel or suppress the alarm notification.

In some embodiments, a worker may press the alarm initiation button for a predetermined period (e.g., 1-3 seconds) to self-check. Upon detecting the press of the button, the activation component 564 may trigger a self-checking process by, for example, informing a user feedback component 567 to send a self-check feedback (e.g., multiple short pulses of vibration) to the worker. The self-check feedback may include, for example, an "OK" vibratory signal, or an "Error" vibratory signal when the worker presses the button for a self-checking process.

When a worker initiates an alarm notification via, for example, the alarm initiation system 56, the notification system 6 can process the alarm notification and alert recipients (e.g., other workers 5) via the notification/response devices 33 in the manner of, for example, broadcasting the alarm notification to the workers 5 in the field and/or the users 3. In some embodiments, the notification system 6 can detect the respective states of the workers 5 and determine which worker(s) are ready to respond to the alarm. The notification system can assess the real-time contextual information by considering the workers' current state data to determine whether a worker in the field is ready to respond. For example, when the notification system 6 detects that worker B who is close to the alarm-initiator worker A is not ready to respond to the alarm, the notification system 6 may send the alarm to a group of workers in the field who are ready to respond to the alarm. It is to be understood that the alarm can be sent to the recipients via any suitable means, including, for example, one or more devices to generate audible notification (e.g., one or more speakers), visual notification (e.g., one or more displays, light emitting diodes (LEDs) or the like), tactile notification (e.g., a device that vibrates or provides other haptic notification), etc.

Referring again to FIG. 2, the intelligent assistant 62 of the notification system 6 can use the contextual information 22 to provide various guidance to a user to set up notification parameters or adjust notifications from current notification configurations. FIGS. 6-11 illustrates screenshots of user interfaces generated by an intelligent assistant (e.g., the intelligent assistant 62 in FIGS. 2 and 3) for a user (e.g., a supervisor or safety manager) to guide a user to set up or adjust notifications, according to some embodiments.

In the exemplary user interface 600 of FIG. 6, the intelligent assistant 62 provides guidance for the supervisor in the form of defaults to set up parameters for notification adjustment for an event of visor-up (i.e., when a visor of worker's PPE is detected to be up). The provided adjustment parameters include, for example, types of adjustment (e.g., defer, redirect, broadcast, prevent, etc.), desired recipients, duration of the notification, locations, etc. The supervisor can manually input the parameters at the user interface 600 and the intelligent assistant 62 can store the instructions in current safety notification configurations as default settings for the notification. The default settings can serve as an initial notification configuration that specifies a domain of notification for each event. The user interface 600 also provides options for the user to view or edit previous notification adjustments by pressing a button 605.

Figure 7A:
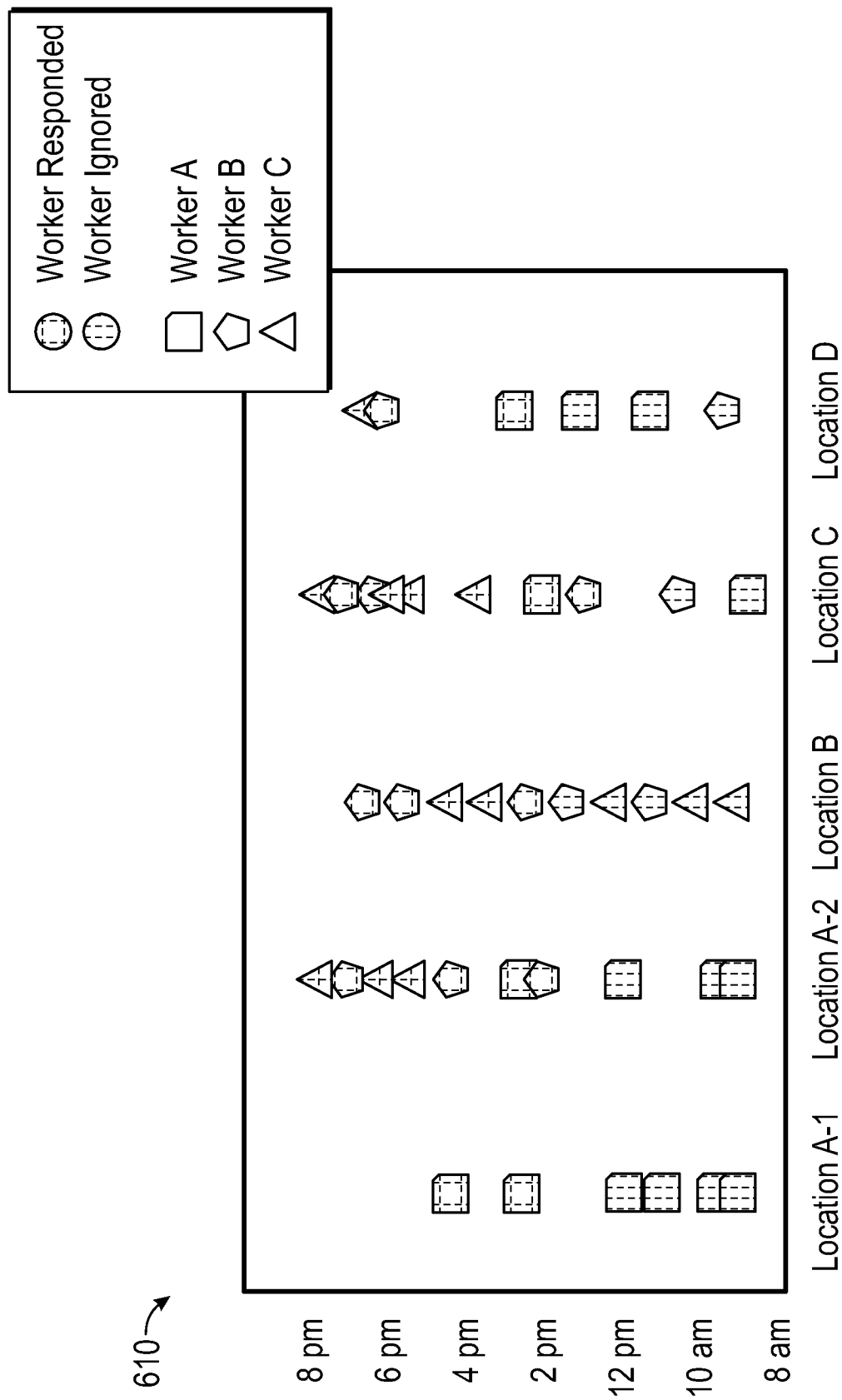
FIG. 7A illustrates a screenshot of a UI or dashboard generated by an intelligent assistant of a notification system to visualize history data, according to one embodiment.
Figure 7B:
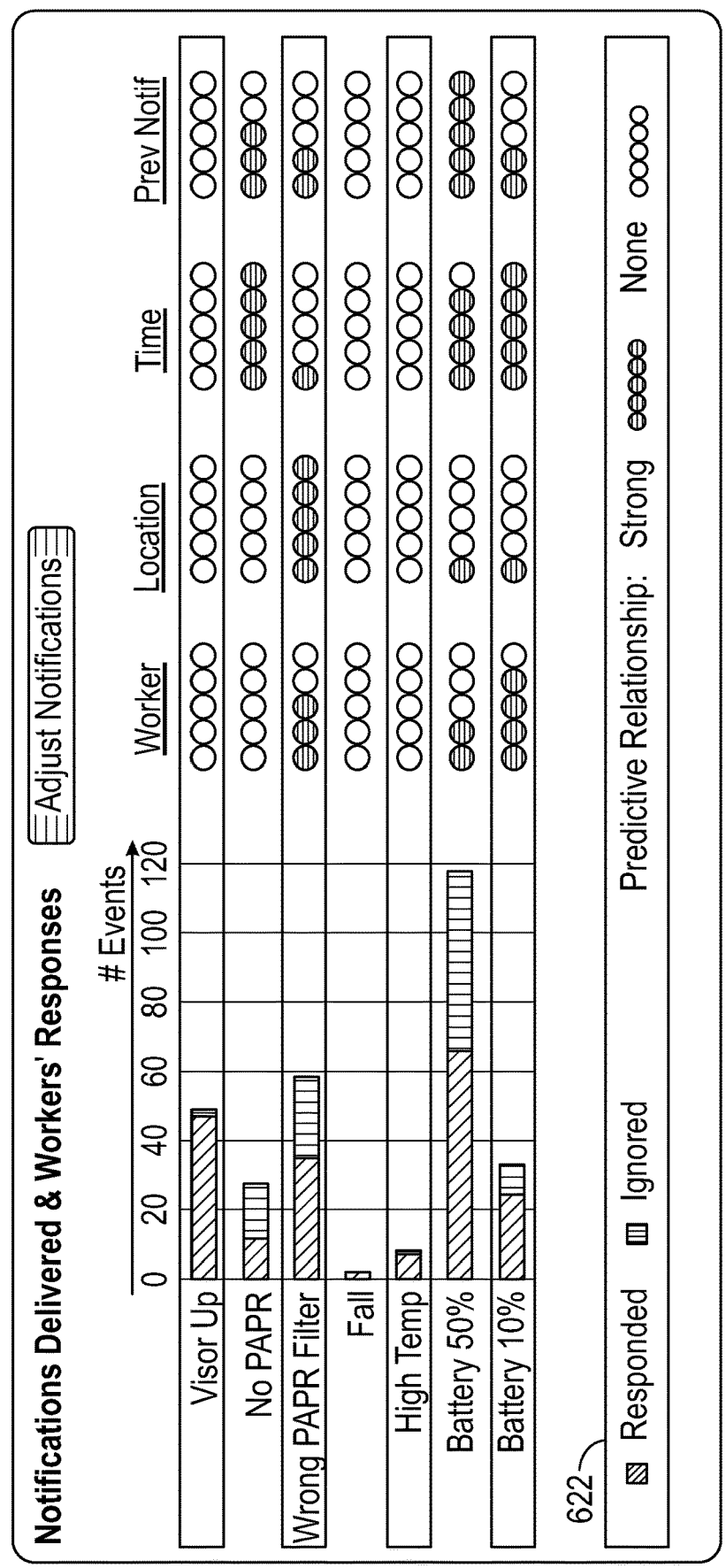
FIG. 7B illustrates a screenshot of a UI or dashboard generated by an intelligent assistant of a notification system to visualize history data, according to another embodiment.

In some embodiments, an intelligent assistant can provide data visualization via various user interfaces or dashboards. FIGS. 7A-B illustrate screenshots of exemplary dashboards generated by an intelligent assistant of a notification system to show history data and system state to a user (e.g., a supervisor), according to some embodiments.

In the user interface 610 of FIG. 7A, the intelligent assistant visualizes the history data of how different workers response to notifications at different locations and at different times of day. Each notification is indicated by a symbol in the user interface. The symbols are arranged according to the time (y-axis) and location (x-axis). Symbols with lattice fill represent notifications that the worker responded to, and vertical-striped symbols represent notifications that were ignored. The intelligent assistant can analyze the patterns of ignored notifications and adjust notification configurations or propose notification configuration adjustments based on the analysis. In the depicted embodiment of FIG. 7A, the pattern reveals that notifications were being ignored if they occurred before noon.

In the user interface 620 of FIG. 7B, the intelligent assistant visualizes the history data of workers' response to notifications and the current system state. The user interface 620 also includes statistical analysis of the history data such as, for example, a predictive relationship 622, which can provide data and analytical support for the user to set up default settings or make any suitable adjustments to the current notification configurations.

In some embodiments, an intelligent assistant can analyze the system's notification behavior and provide suggestions to a user (e.g., a supervisor) to make notification adjustments. In some embodiments, an intelligent assistant can analyze history data of a worker's response history, extract explanatory factors, and propose alternative adjustments. In some embodiments, an intelligent assistant can analyze history data of a user's adjustments, and propose patterns that can be used in subsequent adjustments and in modifying the current safety notification configuration. In some embodiments, an intelligent assistant can provide user interfaces or dashboards to educate users on responses to notifications.

In some embodiments, an intelligent assistant may analyze variables of contextual information such as, for example, worker's locations, time of day, etc., and their respective data (e.g., history data or current state data) to provide explanations or predictions for notification adjustments.

Figure 8:
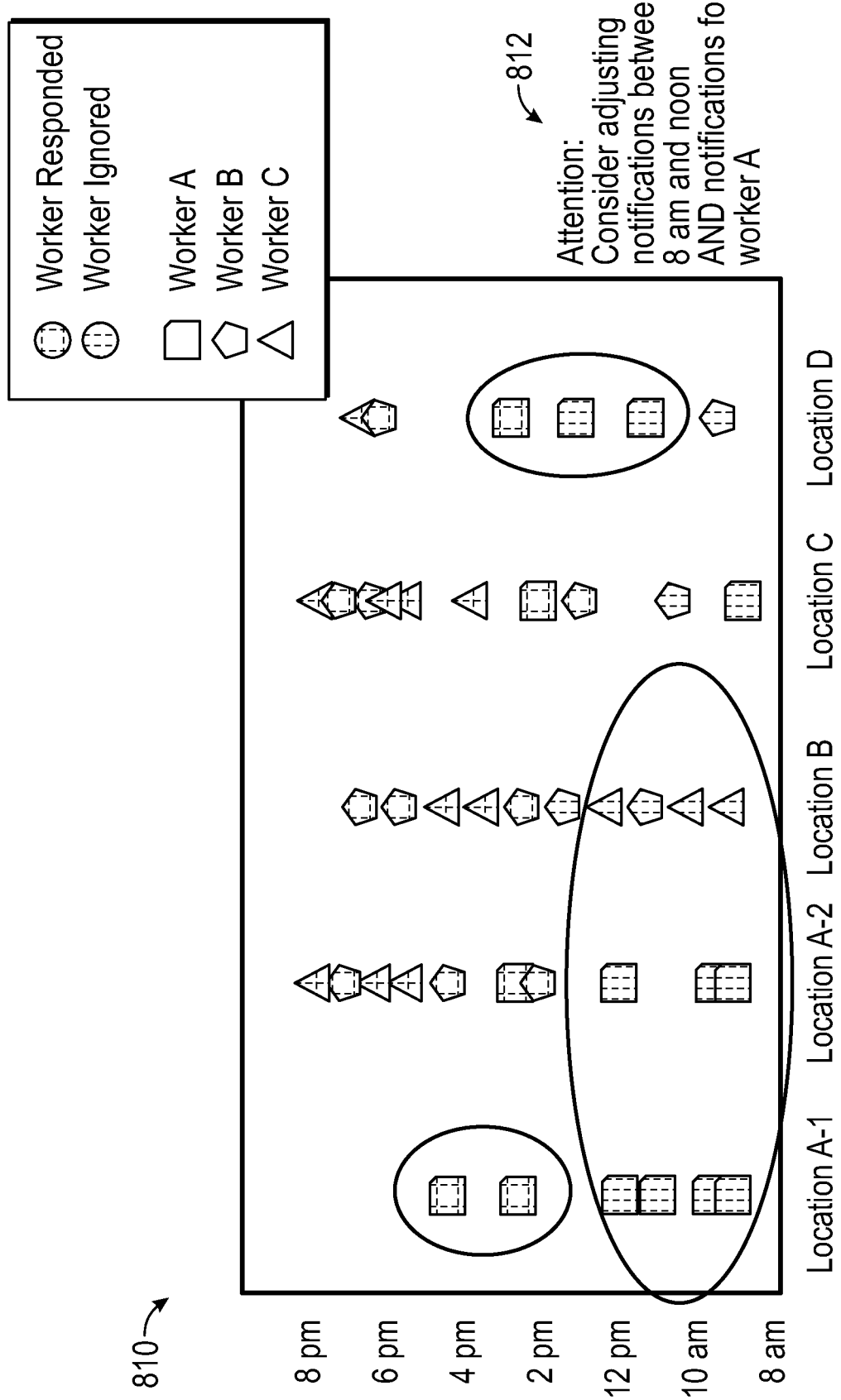
FIG. 8 is a screenshot of a UI or dashboard generated by an intelligent assistant of a notification system to show history data and recommendations for a user to adjust notifications, according to one embodiment.

FIG. 8 is a screenshot of a user interface 810 generated by an intelligent assistant of a notification system to show history data and recommendations for notification adjustments to a supervisor, according to one embodiment. The user interface 810 shows recommendations 812 for adjustment to the current safety notification configurations based on independent effects of "time of day" and "worker." Each notification is indicated by a symbol in the user interface 810. The symbols are arranged according to the time (y-axis) and location (x-axis). Symbols with lattice fill represent notifications that the worker responded to, and vertical-striped symbols represent notifications that were ignored. The intelligent assistant can analyze the patterns of ignored notifications and adjust notification configurations or propose notification configuration adjustments based on the analysis. In the illustrated example, the pattern reveals two potentially important relationships: Worker A (denoted by the dog-eared squares) ignored all notifications, and also there was a tendency across other workers to ignore notifications in the morning in Locations A-1, A-2, and B.

FIG. 9 is a screenshot of a user interface 820 generated by an intelligent assistant of a notification system to show suggestions for notification adjustments to a supervisor, according to one embodiment. In the user interface 820, the intelligent assistant allows a user to specify an adjustment 822 (e.g., defer, redirect, broadcast, or prevent). With the user-identified adjustment, the intelligent assistant can pre-select options 824 based on the contextual information and provide corresponding suggestions 826. This exemplary user interface (UI) 820 shows an abstracted recommendation from the intelligent assistant that "Visor-up" notifications between 8 am and noon in Locations 1-A, 1-B, and 2 are to be deferred. The UI 820 also allows the user to override or revise the IA's recommendation, using the buttons 826 such as the "Time/Day" and "Location edit" buttons.

Figure 10:
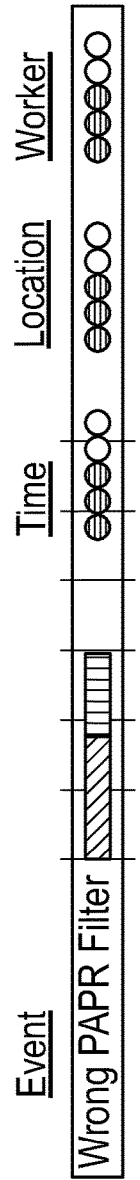
FIG. 10 is a screenshot of a UI or dashboard generated by an intelligent assistant of a notification system to show an adjustment proposal to a use in a narrative or text style with a graphical supplement, according to one embodiment.

FIG. 10 is a screenshot of a dashboard generated by an intelligent assistant of a notification system to show an adjustment proposal to a supervisor in a narrative or text style with a graphical supplement, according to one embodiment. The user interface 830 shows narrative-style presentations of recommendations when there are an increasing number of variables and potential for higher-order interactions therebetween. This exemplary user interface 830 shows a text-based exposition of the rules that including the notification adjustment. The basic situation is similar to that depicted in the user interfaces 810 and 820 where notifications are ignored in the morning in 3 locations. Here in the user interface 830, two workers are affected more than others: workers A and D. Workers' response level (40%) is presented in text at the top of the screen. At the bottom of the screen, there is a pictorial indication of worker response rate, along with the relative strength of response rate association with various explanatory factors (e.g., Time, Location, Worker). In this example, all 3 factors have a moderate association with response level, depicted by the 3 filled circles for each of the 3 factors.

Figure 11:
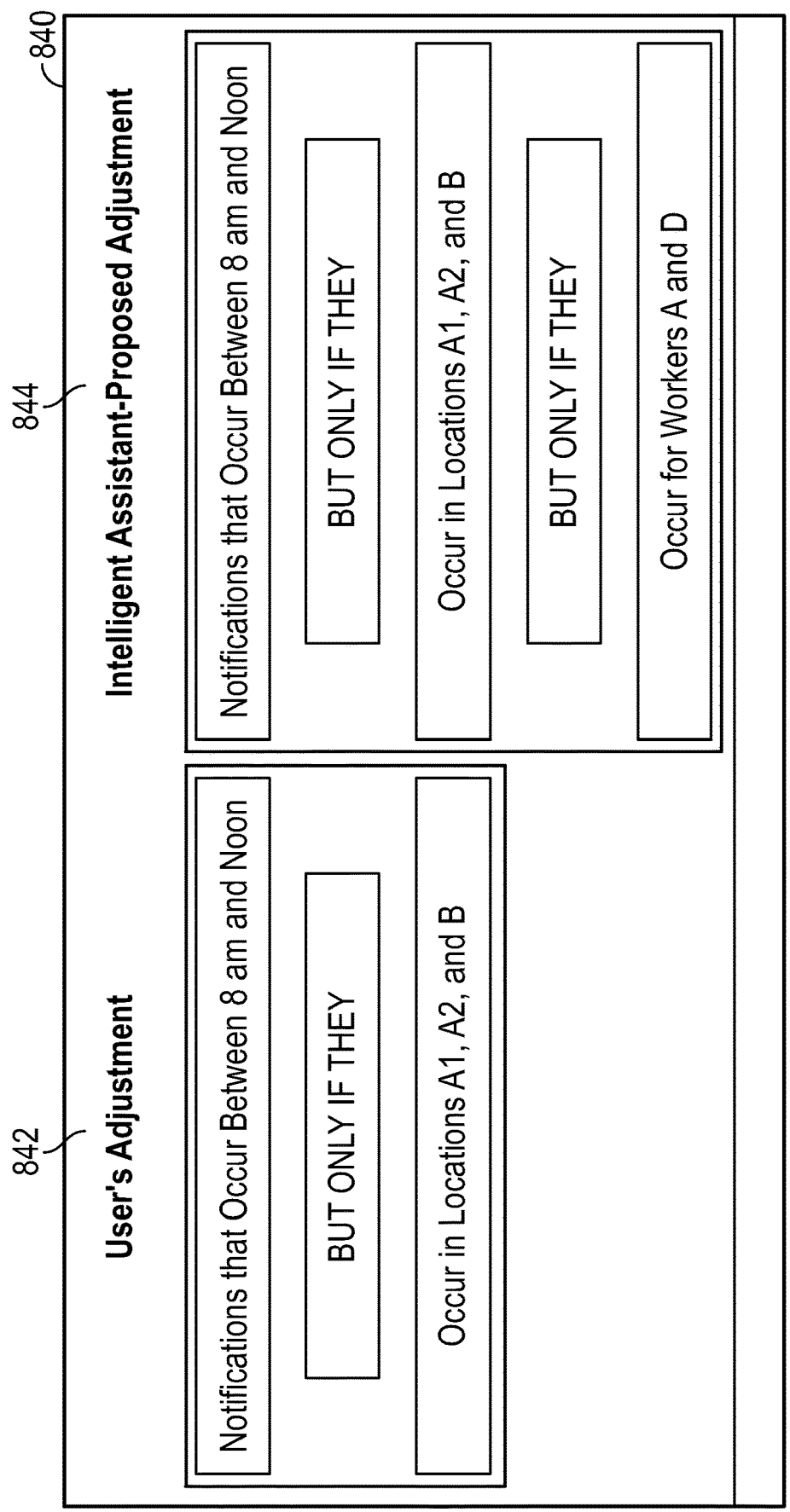
FIG. 11 is a screenshot of a UI or dashboard generated by an intelligent assistant of a notification system to show an adjustment proposal based on a supervisor's adjustment, according to one embodiment.

FIG. 11 is a screenshot of a dashboard 840 generated by an intelligent assistant of a notification system to show an adjustment proposal based on a supervisor's adjustment, according to another embodiment. When the user proposes an adjustment 842 in a way that is at odds with the analysis of an intelligent assistant, the intelligent assistant can generate a display 844 for the user's reference. The proposed adjustment 844 can be based on underlying statistical analyses of relations between the variables. This exemplary user interface 840 builds on the text expression as shown in the user interface 830. The user has proposed a notification adjustment, as shown on the left (842) and the intelligent assistant (IA) has recommended a qualification to that adjustment (844). This example illustrates how the system might promote a cautious approach to notification adjustments. In the user's proposal (842), it is implicit that the adjustment will apply to all workers. Recommending that the adjustment applies to only two workers (844) reduces the overall scope of the change. If the adjustment is a deferral or other reduction in the impact of the notification, the IA counter-proposal (844) is more cautious than the user's proposal.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

LISTING OF EXEMPLARY EMBODIMENTS

Exemplary embodiments are listed below. It is to be understood that any one of embodiments 1-27 and 28-29 can be combined.

Embodiment 1 is a method of managing and delivering notifications to a worker in a work environment, the method comprising:

providing a current notification configuration to a notification system;

receiving, via the notification system, contextual information including real-time information collected from one or more environmental sensors and user sensors; and assessing, via the notification system, the contextual information to determine adjustments to the current notification configuration.

Embodiment 2 is the method of embodiment 1, further comprising adjusting, via the notification system, the current notification configuration based on the assessment.

Embodiment 3 is the method of embodiment 2, wherein the current notification configuration is adjusted to defer, redirect, broadcast, advance, amplify, reduce, or cancel one or more notifications.

Embodiment 4 is the method of embodiment 2 or 3, further comprising adjusting the current notification configuration to be within the bounds of one or more pre-set policies.

Embodiment 5 is the method of any one of embodiments 1-4, further comprising generating, via the notification system, adjustment recommendations based on the assessment.

Embodiment 6 is the method of embodiment 5, further comprising providing, via a user interface, the adjustment recommendations to a user.

Embodiment 7 is the method of embodiment 5 or 6, further comprising receiving input from the user to adjust the current notification configuration.

Embodiment 8 is the method of embodiment 7, further comprising generating safety notifications based on the further adjustment and delivering the safety notifications to the worker.

Embodiment 9 is the method of any one of embodiments 1-8, further comprising assessing user history data including history data of safety notifications sent to the worker, and history data of the worker responding to the safety notifications.

Embodiment 10 is the method of any one of embodiments 1-9, wherein assessing the contextual information includes implementing one or more descriptive or predictive statistics methods including a multiple regression algorithm or an analysis of variance algorithm on the contextual information.

Embodiment 11 is the method of any one of embodiments 1-10, wherein assessing the contextual information includes implementing one or more machine learning algorithms.

Embodiment 12 is the method of any one of embodiments 1-11, further comprising providing a user interface (UI) to present a result of the assessment to a user.

Embodiment 13 is the method of embodiment 12, wherein the user interface (UI) includes default settings reflecting the current notification configuration.

Embodiment 14 is the method of embodiment 12 or 13, wherein the user interface (UI) further includes a dashboard to present the contextual information.

Embodiment 15 is the method of any one of embodiments 12-14, wherein the user interface (UI) further includes automatically generated adjustment recommendations.

Embodiment 16 is the method of embodiment 15, wherein the automatically generated adjustment recommendations can apply to a narrower set of users and/or contexts than a user's originally input instructions.

Embodiment 17 is the method of any one of embodiments 1-16, further comprising providing a notification and response device to the worker, the device including one or more buttons allowing the worker to send a feedback to the notification system.

Embodiment 18 is the method of embodiment 17, further comprising receiving, via a data interface of the notification system, the feedback from the notification and response device.

Embodiment 19 is the method of embodiment 17 or 18, wherein the notification and response device includes an alarm button.

Embodiment 20 is the method of any one of embodiments 17-19, wherein the notification and response device includes a first button to accept a notification and a second button to request adjustment of the notification.

Embodiment 21 is the method of any one of embodiments 17-20, wherein the notification and response device includes a display to present a user interface to receive the worker's feedback.

Embodiment 22 is the method of any one of embodiments 1-21, further comprising directing, via a message initiation component (MIC) of the notification system, a user's notification to the worker, overriding the adjustments to the current notification configuration.

Embodiment 23 is the method of any one of embodiments 1-22, further comprising receiving an alarm notification initiated by the worker.

Embodiment 24 is the method of embodiment 23, further comprising providing a timer to start an alarm count-down to trigger the alarm notification.

Embodiment 25 is the method of embodiment 24, further comprising receiving the worker's instruction to cancel or suppress the alarm notification.

Embodiment 26 is the method of any one of embodiments 23-25, further comprising broadcasting, via the notification system, the alarm notification.

Embodiment 27 is the method of embodiment 26, further comprising determining receivers' states based on the contextual information and directing the alarm notification to a selected group of receivers based on their respective states.

Embodiment 28 is a safety notification system embodied on a computer-readable storage medium, comprising:
 a data interface component to receive first contextual information from one or more environmental sensors and user sensors and second contextual information from one or more wearable notification and response devices;
 an assessing component to assess the first and second contextual information to determine whether to adjust current safety notification configurations;
 an adjusting component to adjust at least some of the current safety notification configurations based on the contextual information to generate adjustment recommendations;
 a user interface to present the adjustment recommendations to a user and receive and send the user's instructions to the assessing component and the adjusting component to generate a notification; and
 a delivery component to deliver the notification to the wearable notification and response devices.

Embodiment 29 is the safety notification system of embodiment 28 to implement the method of any one of embodiments 1-27.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. While the specification has described in detail certain exemplary embodiments, it will be appreciated that those skilled in the art, upon attaining an understanding of the foregoing, may readily conceive of alterations to, variations of, and equivalents to these embodiments.

What is claimed is:

1. A method of managing and delivering notifications to a user, the method comprising:
 providing a current notification configuration to a notification system;
 receiving, via the notification system, contextual information including a combination of first real-time information collected from one or more environmental sensors and second real-time information collected from one or more user sensors, wherein the first real-time information includes one or more of air temperature, humidity, air velocity, or heat radiation in a work environment at which the user is located, and wherein the second real-time information includes one or more biological measurements associated with the user;
 implementing, by the notification system, a machine learning (ML) model trained according to a reinforcement learning algorithm to assess the contextual information to determine one or more adjustments to the current notification configuration; and
 adjusting, using the notification system, the current notification configuration in response to determining that the contextual information is of a sufficient quantity based on a predetermined level of certainty and based on the one or more determined adjustments to form an adjusted notification configuration.

2. The method of claim 1, wherein the adjusted notification configuration is configured to defer, redirect, broadcast, advance, amplify, reduce, maintain, or cancel one or more notifications associated with the current notification configuration.

3. The method of claim 1, further comprising adjusting the current notification configuration to be within the bounds of one or more pre-set policies.

4. The method of claim 1, further comprising outputting, via a user interface (UI), one or more adjustment recommendations that are associated with the adjusted notification configuration.

5. The method of claim 4, further comprising receiving, via the UI, one or more inputs indicating one or more adjustments to the current notification configuration.

6. The method of claim 5, further comprising:
 generating one or more safety notifications based on the one or more adjustments; and delivering the one or more generated safety notifications to the user.

7. The method of claim 1, further comprising assessing user history data including first history data representing safety notifications sent to the user, and second history data representing one or more responses of the user to the safety notifications.

8. The method of claim 1, further comprising providing a user interface (UI) to present a result of the assessment to the user.

9. The method of claim 8, wherein the UI includes one or more default settings reflecting the current notification configuration.

10. The method of claim 8, wherein the UI includes a dashboard to present the contextual information.

11. The method of claim 8, wherein the UI includes automatically generated adjustment recommendations.

12. The method of claim 1, further comprising communicating, by the notification system, with a notification and response device one or more buttons that enable the user to send feedback to the notification system.

13. The method of claim 12, wherein the one or more buttons of the notification and response device include an alarm button.

14. The method of claim 12, wherein the one or more buttons of the notification and response device include a first button to accept a notification and a second button to request adjustment of the notification.

15. The method of claim 1, further comprising directing, by the notification system, via a message initiation component (MIC), a notification to the user, the notification overriding the one or more adjustments to the current notification configuration.

16. The method of claim 1, further comprising:
receiving, by the notification system, an alarm notification initiated by the user; and
broadcasting, via the notification system, the alarm notification to a selected group of receivers based on respective states associated with each respective receiver of the selected group.

17. A safety notification system comprising:
a data interface component to receive first contextual information from one or more environmental sensors and user sensors and second contextual information from one or more wearable notification and response devices, wherein the first real-time information includes one or more of air temperature, humidity, air velocity, or heat radiation in a work environment at which the user is located, and wherein the second real-time information includes one or more biological measurements associated with the user;
an assessing component to implement a machine learning (ML) model trained according to a reinforcement learning algorithm to assess the first and second contextual information to determine whether to adjust current safety notification configurations;
an adjusting component to adjust at least some of the current safety notification configurations in response to a determination that the contextual information is of a sufficient quantity based on a predetermined level of certainty and based on the contextual information to generate one or more adjustment recommendations;
a user interface (UI) configured to:
present the one or more adjustment recommendations to a user;
receive instructions from the user; and
send the instructions to the assessing component and the adjusting component to generate a notification; and
a delivery component to deliver the notification to the wearable notification and response devices.

18. The method of claim 1, wherein the one or more biological measurements include one or more of a body temperature or a galvanic skin response associated with the user.

19. The method of claim 1, wherein the reinforcement learning algorithm is configured to control a learning rate of the ML model according to which the ML adapts the current safety notification system.

* * * * *